United States Patent [19]
Wong et al.

[11] Patent Number: 4,953,119
[45] Date of Patent: Aug. 28, 1990

[54] MULTIPLIER CIRCUIT WITH SELECTIVELY INTERCONNECTED PIPELINED MULTIPLIERS FOR SELECTIVELY MULTIPLICATION OF FIXED AND FLOATING POINT NUMBERS

[75] Inventors: Kenneth J. Wong, Anaheim; Steven P. Davies, Ontario, both of Calif.

[73] Assignee: Hughes Aircraft Company, Los Angeles, Calif.

[21] Appl. No.: 303,789

[22] Filed: Jan. 27, 1989

[51] Int. Cl.$^5$ .............................................. G06F 7/52
[52] U.S. Cl. .................................................. 364/754
[58] Field of Search ........................ 364/754, 757–760, 364/748, 736

[56] References Cited

U.S. PATENT DOCUMENTS

| | | | |
|---|---|---|---|
| 4,541,048 | 9/1985 | Propster et al. | 364/200 |
| 4,594,679 | 6/1986 | George et al. | 364/757 |
| 4,755,962 | 7/1988 | Mor | 364/760 |
| 4,825,401 | 4/1989 | Ikumi | 364/757 |

Primary Examiner—Gary V. Harkcom
Assistant Examiner—Long T. Nguyen
Attorney, Agent, or Firm—Wanda K. Denson-Low

[57] ABSTRACT

A multiplier which processes 32 bit operands to provide two 16 bit by 16 bit fixed point products or one 32 bit floating point product during each clock pulse. Two 16 bit by 16 bit fixed point products or one 32 bit floating point product are initiated on every clock pulse and results of the multiplication process are available after a fixed pipeline delay on a continuous basis. The fixed and floating point pipeline operations may also be interleaved. The 32 bit input operands are selected from three external sources or from the last output product. A modified Booth algorithm is implemented employing dual parallel processing paths which are employed to separately produce the 16 bit by 16 bit fixed point products or are combined to produce the 32 bit floating point product. Exponent computations are performed in parallel in the floating point computational mode.

5 Claims, 3 Drawing Sheets

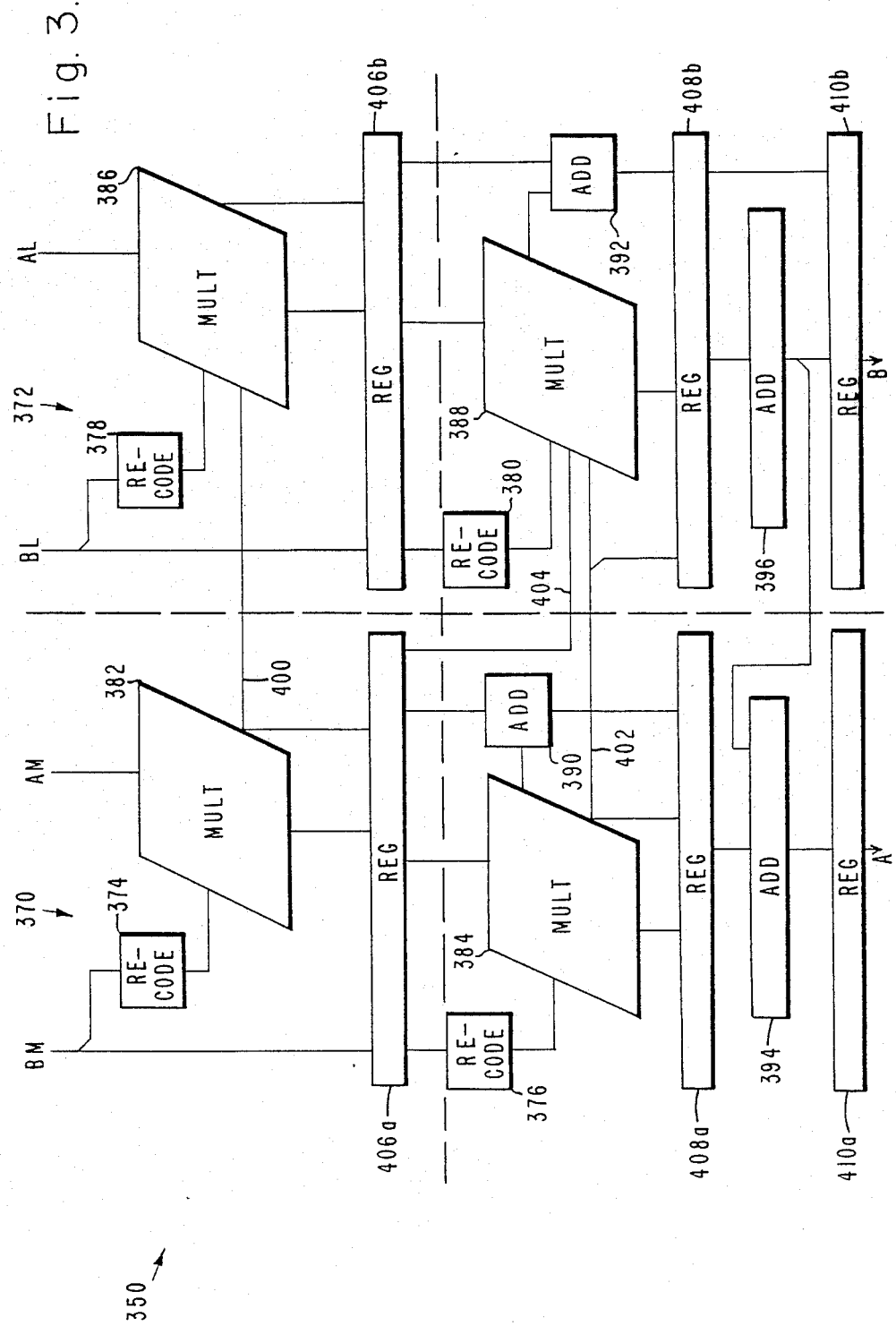

MULTIPLIER CIRCUIT WITH SELECTIVELY INTERCONNECTED PIPELINED MULTIPLIERS FOR SELECTIVELY MULTIPLICATION OF FIXED AND FLOATING POINT NUMBERS

BACKGROUND OF THE INVENTION

The present invention generally relates to digital signal processing systems and in particular to a multiplier for use in such systems that performs complex fixed and floating point arithmetic multiplications.

The ability to perform sophisticated vector and scalar arithmetic operations in real time is an important aspect of signal processing systems. Often, however, this requirement is also accompanied by severe physical constraints upon the size, weight, power and cooling of the signal processing system. In the past, signal processor designers have had to compromise among competing requirements, many times resulting in processors with less than adequate performance.

Conventional signal processors may also be limited in performance due to relatively slow system clock rates of around five megahertz, and limited capability to operate on 16 bit fixed point data. The fixed point operational limitations of such conventional signal processors has become significant in many application environments. Many signal processing algorithms require arithmetic computations having a large dynamic range, making 32 bit floating point processing necessary.

With reference to the present invention, complex arithmetic multiplications are frequently utilized in digital signal processing. Complex multiplication, which requires four real number multiplications and two real number additions, has conventionally been computed using very complex circuitry.

Typical of such multipliers is one described in a paper entitled "A 16 Bit×16 Bit Pipelined Multiplier Macrocell," by Dennis A Henlin et al, in *IEEE Journal of Solid-State Circuits*, Vol. SC-20, No. 2, pages 542–547, Apr., 1985. This multiplier employs the well-known modified Booth algorithm to accomplish the multiplication.

Conventional multipliers typically process either fixed point data or floating point data. Typical of such conventional multipliers are those commercially available from Weitek Corporation, Raytheon Incorporated, or Analog Devices Incorporated, and other semiconductor manufactures. However, when it comes to applications requiring both fixed and floating point multiplications within a single multiplier device, which device multiplies operands having a large dynamic range, no conventional multiplier provides the resources to accomplish such multiplications.

SUMMARY OF THE INVENTION

In order to overcome the limitations of conventional multipliers, the present invention provides for a multiplier which performs complex fixed and floating point arithmetic multiplications on a plurality of selected input words having a predetermined data word length (32 bits). The multiplier is a parallel pipelined multiplier arrangement which implements a modified Booth algorithm. The present multiplier permits processing of 32 bit data input words in either dual 16 bit fixed point data word format or one 32 bit floating point data word format.

The multiplier includes input logic for receiving the input data words and for selectively providing first and second output words comprising a least significant word and a most significant word, each word having a selected word length. A multiplier unit is coupled to the input logic which comprises first and second selectively interconnected parallel pipelined multiplier paths configured to implement a modified Booth algorithm. The two multiplier paths process the least significant words and most significant words of the first and second data words, respectively. First and second adders are coupled to respective second multipliers of each path. The adder of the first multiplier path has an output selectively coupled to an input of the adder of the second multiplier path to provide a carry input thereto.

The two multiplier paths process the least significant words and most significant words of the first and second data words, respectively. Each multiplier path includes two recorders which are adapted to recode the multiplicands in accordance with the modified Booth algorithm. Outputs of each of the recorders are coupled to respective multipliers to which they are associated. Pipeline registers are interposed between the two multipliers of each respective path and after the second multipliers of each path. Adders are provided at the outputs of the second multipliers of each path as is required by the modified Booth algorithm. A second set of adders are coupled to respective second multipliers of each path, and to the adders of each of the multiplier paths.

The first multiplier path is connected to the second multiplier path at a variety of points. These data paths are selectively enabled when processing 32 bit floating point data, and are disabled when processing 16 bit fixed point data.

The parallel and interleaved architecture of the present invention permits processing of 32 bit data input words in either dual 16 bit fixed point data word format or one 32 bit floating point data word format. Selectively decoupling the two multiplier paths permits processing of the 32 bit input data words in the form of two 16 bit by 16 bit fixed point data words to produce two 32 bit fixed point products.

Post multiplier logic including the adders allows the two 32 bit fixed point products to be combined into a single 32 bit word in any one of four ways. For integer multiplication, the least significant 16 bits of each product may be packed into a 32 bit word. For fractional multiplication, the most significant 16 bits of each product may be packed into a 32 bit word. For complex multiplication, the sum or difference of the two products is calculated. Selectively coupling the two multiplier paths together permits processing of the 32 bit floating point data word to produce one 32 bit floating point product. The multiplier also includes an exponent processor coupled in parallel with the multiplier which processes exponent values associated with floating point multiplications performed by the multiplier.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 3 is a detailed diagram of the multiplier unit of the multiplier of FIG. 2.

DETAILED DESCRIPTION

Figure 1:
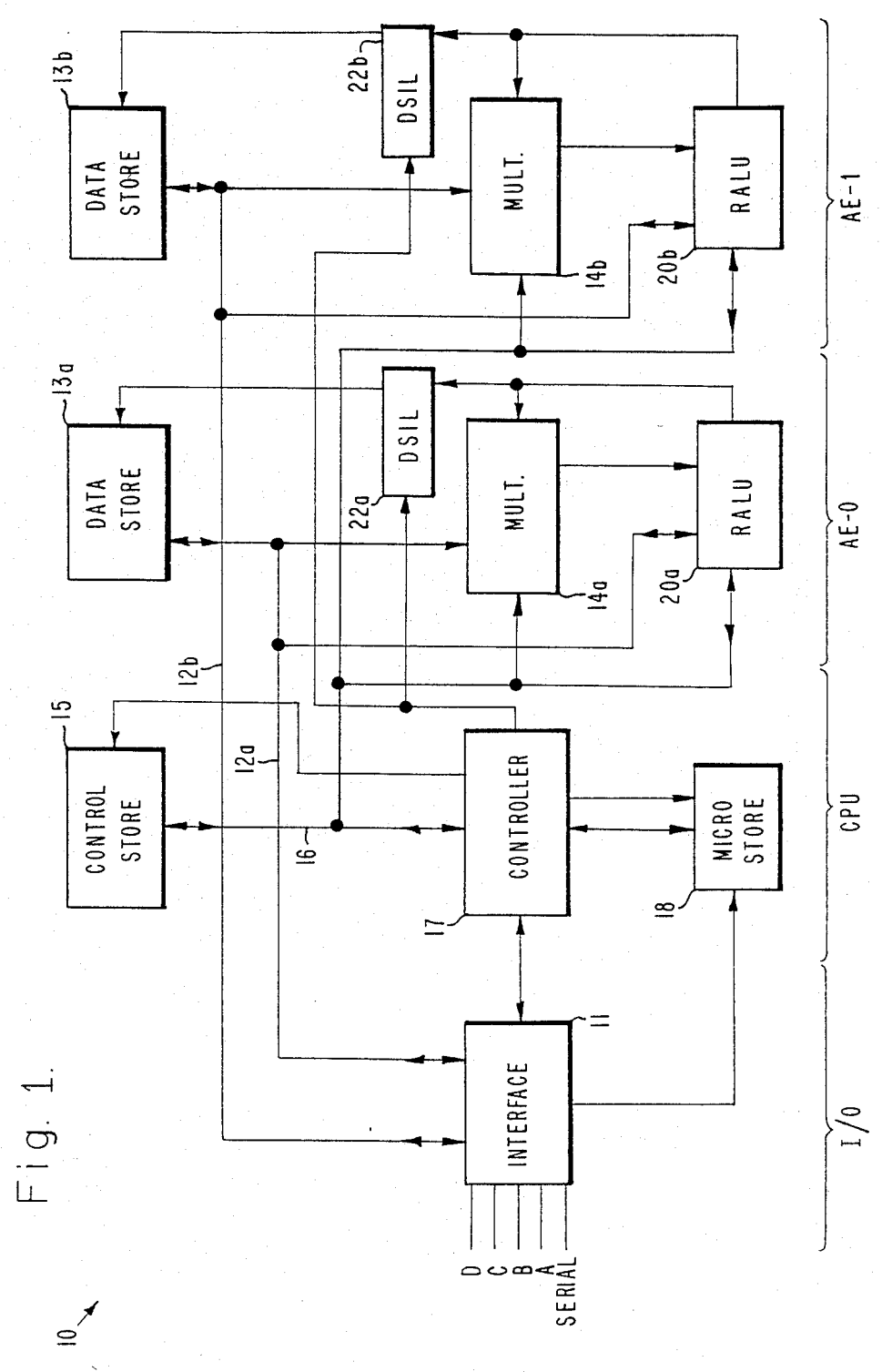
FIG. 1 is a block diagram of a signal processor incorporating a multiplier in accordance with the principles of the present invention.

Referring to FIG. 1 shown therein is a block diagram of a signal processor 10 incorporating two multipliers 14 in accordance with the principles of the present invention. The signal processor 10 will be described in general terms to provide a context for describing the multiplier 14.

The signal processor 10, shown in FIG. 1, generally comprises four main sections: an input/output section, designated as I/O, a central processing unit designated as CPU, and two arithmetic elements, designated as AE0 and AE1. In particular, the input/output section includes an external interface unit 11 which provides a plurality of configurable input/output ports. The external interface unit 11 is coupled by way of data busses 12a, 12b to two data store memories 13a, 13b, which are employed to store data, and to two multipliers 14a, 14b, and two register and arithmetic logic units 20a, 20b, which operate on the data. The data store memories 13a, 13b typically store data in a predefined packed format in order to conserve memory space, in a manner which is well-known in the art.

A control store memory 15, which is employed to store control codes, is coupled by way of a control store bus 16 to an arithmetic element controller 17, to the multipliers 14a, 14b and to two register and arithmetic logic units 20a, 20b. A micro store memory 18 is coupled to the arithmetic element controller 17 and is employed to store microcode instructions which are utilized by the data store memories 13a, 13b, multipliers 14a, 14b, and the register and arithmetic logic units 20a, 20b.

The processor 10 generally functions as follows. Signals to be processed by the processor 10 are received by way of the computer interface 11 and stored in the data store memories 13a, 13b. Microcode instructions defining the processing parameters of the arithmetic elements of the processor and what steps are to be performed by the arithmetic elements, AE0, AE1, are stored in the micro store memory 18. An application program consisting of pointers to microcode instructions, programmable coefficients to be used by the arithmetic elements during computations, and intermediate data processing results from the arithmetic elements are stored in the control store memory 15. The arithmetic element controller 17 executes application programs which cause the microcode instructions to be executed and the data to be processed. The arithmetic elements AE0, AE1, operate as parallel pipeline processors, to process the data in accordance with the microcode instructions, under control of the arithmetic element controller, and in a conventionally understood manner.

Control parameters are passed from the control store memory 15 to the multipliers 14a, 14b and the register and arithmetic logic units 20a, 20b, and the data from the data store memories 13a, 13b are processed by the arithmetic elements AE0 and AE1, under control of the arithmetic element controller 17 in a conventionally understood manner.

Figure 2:
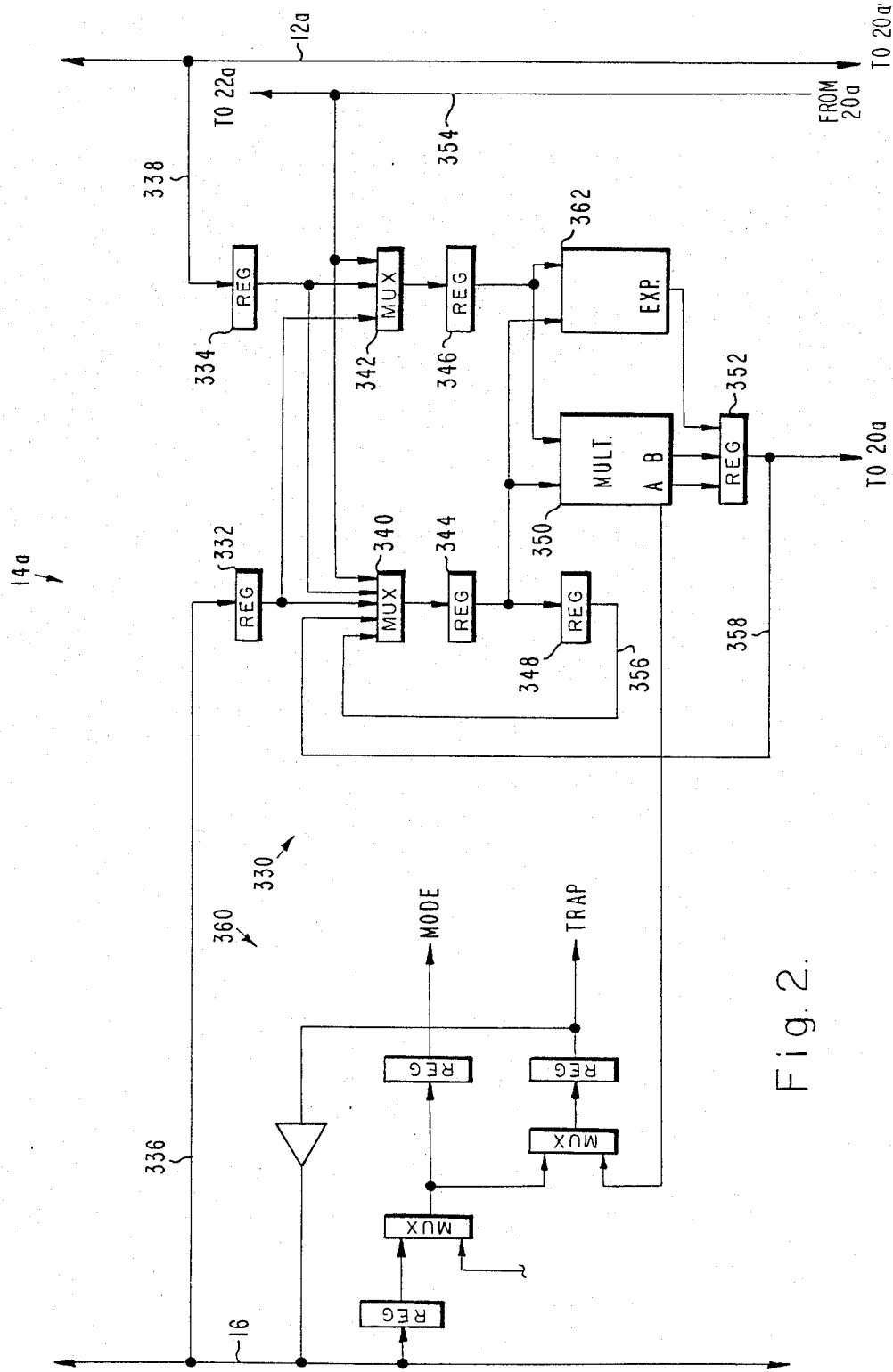
FIG. 2 is a detailed block diagram of the multiplier of FIG. 1.

Referring to FIG. 2, a multiplier in accordance with the principles of the present invention is shown, and it includes connections to the various components of the signal processor 10 shown in FIG. 1. While the present invention is disclosed with reference to its incorporation in the above-described signal processor 10 and architecture, it is not restricted to use therewith. The present invention may be employed as a stand alone multiplier suitable for applications other than the above-described processor.

The multiplier 14 comprises an input logic circuit 330 which includes control store and data store unpacking logic 332, 334, coupled to control store and data store busses 336, 338. Two multiple input multiplexers, comprising a five input multiplexer 340 and a three input multiplexer 342 have their inputs coupled to respective unpacking logic circuitry 332, 334 for receiving output data signals therefrom. Outputs of the unpacking circuitry 332, 334 are coupled from each of the logic circuitry 332, 334 to the three-input multiplexer 342 and to the five-input multiplexer 340.

Outputs from the two multiplexers 340, 342 are coupled by way of first and second registers 344, 346 to a multiplier unit 350 and to an exponent processor 362. In addition, the output of the first register 344 is coupled through a third register 348 whose output is fed back as an input to the five input multiplexer 340 along data path 356. Outputs of the multiplier unit 350 and from the exponent processor 362 are coupled to a multiplier output register 352. The output of the output register 352 is coupled to an input of the five input multiplexer 340 along data path 358 and to the register and arithmetic logic unit of the system 10.

In the signal processor 10, signals are coupled from the register and arithmetic logic unit 20 to the multiplier 14. These input signals are coupled to the remaining inputs of the two multiplexers 340, 342 along data path 354.

A status/mode logic circuit 360 is coupled to the control store bus 336 and to the multiplier unit 350. The status/mode logic circuit 360 provides status, mode and trap signals to various components of the system in order to ensure proper pipelining of the data through the multiplier 14 and the other components of the system 10. The details of the data registers and multiplexers of the status/mode circuit 360 are clearly shown in FIG. 2, and will not be discussed in detail herein.

Referring to FIG. 3, a detailed diagram illustrating the multiplier unit 350 of the present invention is shown. The multiplier unit 350 comprises first and second selectively interconnected parallel pipelined multiplier paths 370, 372, configured to implement a modified Booth algorithm. The modified Booth algorithm is well-known in the art and is discussed in some detail in the paper entitled "A 16 Bit×16 Bit Pipelined Multiplier Macrocell," by Dennis A Henlin et al, in *IEEE Journal of Solid-State Circuits*, Vol. SC-20, No. 2, pages 542–547, Apr., 1985, and in a book by K. Hwang entitled "*Computer Arithmetic*," New York: Wiley, 1979.

The two multiplier paths 370, 372, process the least significant words and most significant words of the first and second data words, respectively. These are identified as AL, BL and AM, BM. These data words are derived from the signals provided by the first and second registers, respectively. Each multiplier path 370, 372 comprises two recoders 374, 376 and 378, 380, which are adapted to recode the multiplicands AL, BL, in accordance with the modified Booth algorithm. Outputs of each of the recoders 374, 376, 378, 380 are coupled to respective multipliers 382, 384, 386, 388 to which they are associated.

First pipeline registers 406a, 406b are interposed between the two multipliers 382, 384 and 386, 388 of each respective path 370, 372. Second pipeline registers 408a, 408b are interposed after the second multipliers 384, 388 of each path 370, 372. Adders 390, 392 are provided at the outputs of the second multipliers 384, 388 of each path 370, 372 for summing completed partial products. A second set of adders 394, 396 are coupled to respective second multipliers 384, 388 of each path, and to the adders 390, 392 of each of the multiplier paths 370, 372. Outputs of each of the second set of adders 394, 396 are respectively coupled to output registers 410a, 410b, from which are provided the output products of the multiplier 350.

The first multiplier path 370 is connected to the second multiplier path 372 at a variety of points. The first and second multipliers of each path are interconnected by way of two data paths 400, 402, while the register separating the two multipliers of the first path is connected to the second multiplier 388 of the second path 372 by way of data path 404. The adder of the second multiplier path which processes the least significant words has an output selectively coupled to the adder 394 of the second multiplier path to provide a carry input thereto. These connections are such that the two paths 370, 372 operate singularly or in parallel to process 24 bit by 24 bit or 16 bit by 16 bit data, respectively, depending upon the enabling of the connecting data paths. These interconnected data paths 370, 372 are selectively enabled when processing 32 bit floating point data, and are disabled when processing 16 bit fixed point data.

No control lines or logic have been shown in the drawing for either the signal processor 10, or for the multiplier 14 of the present invention. However, Table 1 below shows a 64 bit word having opcode mnemonics identified therein wherein bits 28–35, are employed by the multiplier 14 of FIG. 2. The bits identified in Table 1 as Multiplier are associated with the multiplier 14. These opcodes are referred to in Tables 2–6 below, which provide a description of the microcode instruction set for the control store words (CSDATA) and data store words (DSDATA) utilized to implement the control logic for the multiplier 14 of the present invention. Table 7 presents the status mode register (SMR) bits for the multiplier 14.

TABLE 1

| Unit | Bits | Word Partitioning Field | Comment |
|---|---|---|---|
| Address Gen. | 63–60 | MOD | |
| | 59–57 | OPER | |
| | 56–53 | OP1 | Data/Offset |
| | 52–49 | OP2 | Data/Offset |
| | 48–46 | CR | |
| | 45–43 | DR | |
| Memory | 42–39 | CS | |
| | 38–36 | DS | |
| Multiplier | 35–34 | A | Status/Mode Register (SMR) |
| | 33–31 | B | SMR |
| | 30–28 | MOP | SMR |
| RALU | 27–26 | I | SMR |
| | 25 | FLG | SMR |
| | 24–21 | MD | SMR |
| | 20–15 | RPO | SMR |
| | 14–10 | A | SMR |
| | 9–5 | B | SMR |
| | 4 | S | SMR |
| | 3–2 | DE | |
| | 1 | FI | Reserved |
| | 0 | FO | Reserved |

TABLE 2

Microcode Instruction Set (Run Mode)
CSDATA Access-msdata<42:39>

| Field | Opcode | Operation |
|---|---|---|
| 0 | NS | Nop, Default long word |
| 1 | NL | Nop, Default long word |
| 2 | LR | Load SMR from CSDATA |
| 3 | ENA | Nop, Default long word |
| 4 | ES0 | Output SMR from MULT 1 |
| 5 | EN0 | Nop, Default long word |
| 6 | ES1 | Output SMR from Mult 1 |
| 7 | EN1 | Nop, Default long word |
| 8 | RS | Read CSDATA short word |
| 9 | RL | Read CSDATA long word |
| 10 | WSA | Nop, Default short word |
| 11 | WLA | Nop, Default long word |
| 12 | WS0 | Nop, Default short word |
| 13 | WL0 | Nop, Default long word |
| 14 | WS1 | Nop, Default short word |
| 15 | WL1 | Nop, Default long word |

TABLE 3

Micocode Instruction Set
DSDATA Access-msdata<38:36>

| Bit | Opcode | Operation |
|---|---|---|
| 0,2 | NS, ES | Nop, Default long word |
| 1,3 | NL, EL | Nop, Default long word |
| 4,6 | RS, WS | Read DSDATA short word |
| 5,7 | RL, WL | Read DSDATA long word |

TABLE 4

Microcode Instruction Set
A and B Operand Selections - msdata<35:31>

| Bit (octal) | Opcode | Operand Selected A | B |
|---|---|---|---|
| 00 | HH | Hold, A1 = A1 | Hold, B1 = B1, B2 = B2 |
| 01 | HR | Hold, A1 = A1 | B1 = RALU, B2 = B1 |
| 02 | HC | Hold, A1 = A1 | B1 = CSDATA, B2 = B1 |
| 03 | HD | Hold, A1 = A1 | B1 = DSDATA, B2 = B1 |
| 04 | HM | Hold, A1 = A1 | B1 = MOUT, B2 = B1 |
| 05 | HE | Hold, A1 = A1 | Exchange, B1 = B2, B2 = B1 |
| 06 | HS1 | Hold, A1 = A1 | Swap B1 MSW and LSW, hold B2 |
| 07 | RH | A1 = RALU | Hold, B1 = B1, B2 = B2 |
| 10 | SH | Swap A1 MSW and LSW | Hold, B1 = B1, B2 = B2 |
| 11 | SR | Swap A1 MSW and LSW | B1 = RALU, B2 = B1 |
| 12 | SC | Swap A1 MSW and LSW | B1 = CSDATA, B2 = B1 |
| 13 | SD | Swap A1 MSW and LSW | B1 = DSDATA, B2 = B1 |
| 14 | SM | Swap A1 MSW and LSW | B1 = MOUT, B2 = B1 |
| 15 | SE | Swap A1 MSW and LSW | Exchange, B1 = B2, B2 = B1 |

TABLE 4-continued
Microcode Instruction Set
A and B Operand Selections - msdata<35:31>

| Bit (octal) | Opcode | Operand Selected A | B |
|---|---|---|---|
| 16 | SS | Swap A1 MSW and LSW | Swap B1 MSW and LSW, hold B2 |
| 17 | RR | A1 = RALU | B1 = RALU, B2 = B1 |
| 20 | CH | A1 = CSDATA | Hold, B1 = B1, B2 = B2 |
| 21 | CR | A1 = CSDATA | B1 = RALU, B2 = B1 |
| 22 | CC | A1 = CSDATA | B1 = CSDATA, B2 = B1 |
| 23 | CD | A1 = CSDATA | B1 = DSDATA, B2 = B1 |
| 24 | CM | A1 = CSDATA | B1 = MOUT, B2 = B1 |
| 25 | CE | A1 = CSDATA | Exchange, B1 = B2, B2 = B1 |
| 26 | CS | A1 = CSDATA | Swap B1 MSW and LSW, hold B2 |
| 27 | RC | A1 = RALU | B1 = CSDATA, B2 = B1 |
| 30 | DH | A1 = DSDATA | Hold, B1 = B1, B2 = B2 |
| 31 | DR | A1 = DSDATA | B1 = RALU, B2 = B1 |
| 32 | DC | A1 = DSDATA | B1 = CSDATA, B2 = B1 |
| 33 | DD | A1 = DSDATA | B1 = DSDATA, B2 = B1 |
| 34 | DM | A1 = DSDATA | B1 = MOUT, B2 = B1 |
| 35 | DE | A1 = DSDATA | Exchange, B1 = B2, B2 = B1 |
| 36 | DS | A1 = RALU | Swap B1 MSW and LSW, hold B2 |
| 37 | RD | A1 = RALU | B1 = DSDATA, B2 = B1 |

TABLE 5
Microcode Instruction Set
Multiplication operations - msdata<30:28>

| Bit | Opcode | Operation |
|---|---|---|
| 0 | FLT | Floating point, A*B |
| 1 | FLX | Fixed/floating point multiply, Float (LSWA)* |
| 2 | DRD | Fixed point, MSW(MSWA*MSWB):MSW(LSWA*LSWB) |
| 3 | DLT | Fixed point, LSW(MSWA*MSWB):LSW(LSWA*LSWB) |
| 4 | XSU | Fixed point, MSWA*MSWB−LSWA*LSWB |
| 5 | XAD | Fixed point, MSWA*MSWB+LSWA*LSWB |
| 6 | QSU | MSW(MOUT):MSW(XSU(A,B)) |
| 7 | QAD | MSW(MOUT):MSW(XAD(A,B)) |

TABLE 6
Microcode Instruction Set
EIUC Halt Mode Instructions

| EIUC<6:3> | Opcode | Operation |
|---|---|---|
| 0 | IDLE | No operation |
| 1 | IDLE | No operation |
| 2 | LDAE | Output DSDELAY<0:3> and DSDATA<28:31> on MS_MULT<0:7>, applies to MULT0 only |
| 3 | WRMS | Output DSDELAY<0:3> and DSDATA<28:31> on MS_MULT<0:7> and load DSDELAY<0:3> with DSDATA<0:3>, applies to MULT0 only |
| 4 | IDLE | No operation |
| 5 | IDLE | No operation |
| 6 | RDAE | Output MS_MULT<0:3> on DSDATA<28:31>, applies to MULT0 only |
| 7 | RAEC | Output MS_MULT<0:3> containing a previous MS_MULT<4:7>, on DSDATA<0:3>, applies to MULT0 |
| 8 | IDLE | No operation |
| 9 | RESET | No operation |
| 10 | BTST | Built-in test mode |
| 11 | IDLE | No operation |
| 12 | SHFL | Shift long scan path |
| 13 | SHFS | Shift short scan path |
| 14 | SSCN | Set TMR<1> and shift short scan path |
| 15 | RSCN | Reset TMR<1> and shift short scan path |

TABLE 7
Status-Mode Register

| SMR Bit | Name | Description |
|---|---|---|
| 31 | TMOF | Trap: multiplier overflow |
| 30 | TMUF | Trap: multiplier underflow |
| 29 | TMIO | Trap: multiplier invalid operation |
| 28 | TMIR | Trap: inexact result |
| 27 | MCSD | Mode: multiplier control store delay |
| 26 | MLIM | Mode: multiplier limiter |
| 25-24 | MRND | Mode: multiplier rounding |

From the information provided herein, including Tables 1-7 and FIGS. 2 and 3, one skilled in the art of signal processor design can manually, or by means of commercially available software, such as software available from The CAD Group of Soquel, Calif., produce the timing and control logic which implements the multiplier 14 of the present invention. This control logic, along with the data flow description provided herein, and its description of operation, is sufficient to permit one skilled in the art to construct the present invention.

In operation, and with reference to FIGS. 2 and 3, the multiplier 14 of the present invention operates as follows. Data to be multiplied is provided along the two data busses 336, 338, although for the implementation in the signal processor 10, a data path from the register and arithmetic logic unit thereof is additionally provided. The data is provided in either 16 bit fixed point format or 32 bit floating point format.

In the dual 16 bit mode, the data in each path is partitioned into a least significant word and a most significant word and applied to the multiplier unit 350. In dual 16 bit fixed point mode, the two parallel multiplier paths 370, 372 are not interconnected and the two paths process the data to produce 16 bit inner and outer products in a conventional manner. When the multiplier 350 is operated in 32 bit floating point mode, the two multiplier paths 370, 372 are interconnected and 24 bits of the 32 bit wide data path are employed for the multiplication process. The 8 additional bits comprise the exponent which is processed in parallel by the exponent processor 362 in a generally conventional manner.

The multiplier 14 also provides for the multiplication of data by data that does not change during each clock pulse without necessitating the use of the data busses 336, 338. This is accomplished by means of the register 348 and its feedback loop to the five input multiplexer 340. This feedback loop permits recycling of the previously used data during every other clock pulse. In addition, the final product of the multiplier 14 may be used as a multiplicand by feeding this product back to the five input multiplexer by way of data path 358.

The multiplier operates on two 32 bit data words and performs two 16 bit by 16 bit or one 24 bit by 24 bit multiplication. After 3 clock delays, two 32 bit or one 48 bit product is provided as an output from fixed and floating point operations, respectively. In parallel with the multiplication operations, the floating point product exponent is calculated.

The multiplier 14 is thus capable of forming complex arithmetic fixed point products during every other clock pulse. Two 16 bit by 16 bit fixed point products or one 32 bit floating point product is initiated on every clock pulse and the results are available after a fixed pipeline delay on a continuous basis. The fixed and floating point pipeline operations may also be interleaved for 32 bit floating point computations. The 32 bit input operands are selected from the three external sources (CSDATA, DSDATA and RALU) or from the last output product.

Thus, a new and improved multiplier has been described which performs complex fixed and floating point arithmetic multiplications on a plurality of selected input words having a 32 bit data word length. The parallel and interleaved architecture of the present invention permits processing of 32 bit data input words in either 16 bit by 16 bit fixed point data word format or one 32 bit floating point data word format.

It is to be understood that the above-described embodiment is merely illustrative of one of the many specific embodiments which represent applications of the principles of the present invention. Clearly, numerous and other arrangements can be readily devised by those skilled in the art without departing from the scope of the invention. In particular, if employed as a non-application specific multiplier, the data inputs could be reduced to two (CSDATA, DSDATA), for example, thus eliminating the RALU input.

What is claimed is:

1. A multiplier circuit for selectively performing real and complex fixed point, and floating-point arithmetic multiplications on a plurality of input words having a predetermined data word length, said multiplier circuit comprising:
input logic means for receiving a plurality of input data words having a predetermined data word length for providing first and second output words comprising least and most significant portions of the input data words;
multiplier means coupled to the input logic means for receiving the first and second output words, and comprising first and second selectively interconnected parallel pipelined multiplier paths configured to implement a modified Booth algorithm for processing the least significant words and most significant words of the first and second output words, respectively, when performing floating-point multiplications, and for processing respective ones of the plurality of input words along the respective multiplier paths when performing fixed-point multiplications;
the first and second multiplier paths each comprising first and second serially connected multipliers having a first pipeline register connected therebetween, and further comprising a second pipeline register connected to an output of the second pipeline register; and
first and second adders respectively coupled to an output of the second multipliers of each path, the adder of the first multiplier path having an output selectively couplable to an input of the adder of the second multiplier path to provide a carry input thereto;
wherein the multiplier means performs floating-point multiplication when the first and second parallel pipelined multiplier paths and the first and second adders are interconnected, and performs fixed-point multiplication when the first and second parallel pipelined multiplier paths and the first and second adders are selectively disconnected.

2. The multiplier of claim 1 wherein said multiplier circuit means further comprises:
first and second serially coupled multipliers disposed in each path, the multipliers of each respective path having recoding logic coupled the input logic means for receiving respective most significant words therefrom, and having the first multiplier of each respective path coupled to the input logic means for receiving respective least significant words therefrom; and
an adder coupled to the first and second multipliers of each path for combining partial product outputs of the multipliers to form an output product of the multipliers.

3. The multiplier of claim 1 wherein said multiplier circuit means further comprises:
exponent processing means coupled in parallel with the multiplier means for processing exponential values associated with floating point multiplications performed by the multiplier means.

4. A multiplier circuit for selectively performing real and complex fixed-point, and floating-point arithmetic multiplications on a plurality of input words having a predetermined data word length, said multiplier circuit comprising:
input logic means for receiving a plurality of input data words having a predetermined data word length, and for providing first and second output words comprising least and most significant portions of the input data words;

multiplier means coupled to the input logic means for receiving the first and second output words, and comprising first and second selectively interconnected parallel pipelined multiplier paths for implementing a modified Booth algorithm, for processing the least significant words and most significant words of the first and second output words, respectively;

the first and second multiplier paths each including first and second serially connected multipliers having a first pipeline register connected therebetween, and a second pipeline register connected to an output of the second multiplier, each path further including an adder coupled to an output of the second multiplier, the adder of the first multiplier path having an output selectively coupled to an input of the adder of the second multiplier path to provide a carry input thereto;

the multiplier means further comprising first and second selectively coupled data paths that are selectively interconnected to respective first and second multipliers, and a selectively coupled data register path selectively interconnecting the first pipeline register of the first multiplier path to the second multiplier of the second multiplier path;

wherein the multiplier circuit performs fixed-point multiplication when the first multiplier path, second multiplier path, and data register paths and the first and second adders are coupled together, and performs floating-point multiplication when the first multiplier path, second multiplier path, and data register paths and the first and second adders are decoupled.

5. A multiplier circuit for selectively performing real and complex fixed-point, and floating-point arithmetic multiplications on a plurality of input words having a predetermined data word length, said multiplier circuit comprising:

input logic means for receiving a plurality of input data words having a predetermined data word length, for providing first and second output words;

multiplier means coupled to the input logic means for receiving the first and second output words, and comprising first and second selectively interconnected parallel pipelined multiplier paths for implementing a modified Booth algorithm;

the first and second multiplier paths each including first and second serially connected multipliers having a first pipeline register connected therebetween, and a second pipeline register connected to an output of the second multiplier, each path further including an adder coupled to an output of the second multiplier, the adder of the first multiplier path having an output selectively couplable to an input of the adder of the second multiplier path to provide a carry input thereto;

the multiplier means further comprising first and second selectively couplable data paths that are selectively interconnected to respective first and second multipliers, and a selectively couplable data register path selectively interconnecting the first multiplier of the first multiplier path to the second multiplier of the second multiplier path;

wherein the multiplier circuit performs fixed-point multiplication when the first multiplier path, second multiplier path, and data register paths and the first and second adders are coupled together, and performs floating-point multiplication when the first multiplier path, second multiplier path, and data register paths and the first and second adders are decoupled.

* * * * *